(12) United States Patent
Nakatsukasa et al.

(10) Patent No.: US 6,354,578 B1
(45) Date of Patent: Mar. 12, 2002

(54) VIBRATION ABSORBER FOR VEHICLE WIPER DEVICES

(75) Inventors: Tetsuya Nakatsukasa, Okazaki; Ikuo Arima, Komaki, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/615,693

(22) Filed: Jul. 17, 2000

(30) Foreign Application Priority Data

Jul. 21, 1999 (JP) .......................................... 11-206362

(51) Int. Cl.[7] .............................................. B60G 11/22
(52) U.S. Cl. ...................... 267/258; 267/293; 267/141.7
(58) Field of Search ................................ 267/257, 258, 267/292, 293, 140.11, 140.2, 141.2, 141.3, 141.4, 141.7, 141, 153

(56) References Cited

U.S. PATENT DOCUMENTS

| 2,515,422 A | * | 7/1950 | Pietz ........................ 267/141.7 |
| 2,893,722 A | * | 7/1959 | Beck ........................... 267/153 |
| 3,128,999 A | * | 4/1964 | Schmitt ....................... 267/153 |
| 3,161,420 A | * | 12/1964 | Rix ........................ 280/124.13 |
| 4,067,531 A | * | 1/1978 | Sikula .................... 248/358 R |
| 4,306,708 A | * | 12/1981 | Gassaway et al. ........ 267/141.3 |
| 4,530,491 A | * | 7/1985 | Bucksbee et al. ........... 267/141 |
| 4,998,997 A | * | 3/1991 | Carlston ........................ 267/3 |
| 5,609,329 A | * | 3/1997 | Scholl ........................ 267/141 |

OTHER PUBLICATIONS

Miyazaki, Naoya "Vibration Absorbing Rubber for Wiper Bracket," *Journal of Nippondenso Technical Disclosure*, Jul. 15, 1987, p. 21.
Nakatsukasa, Tetsuya "Vibration Absorbing Grommet for Wiper Device," *Journal of Nippondenso Technical Disclosure*, Jan. 15, 1999, p. 22.

* cited by examiner

*Primary Examiner*—Douglas C. Butler
*Assistant Examiner*—Xuan Lan Nguyen
(74) *Attorney, Agent, or Firm*—Crompton, Seager & Tufte, LLC (57) ABSTRACT

A vibration absorber is provided between a wiper frame and a vehicle body frame. The vibration absorber includes a cylinder and a pair of flanges arranged near opposite axial ends of the cylinder. The cylinder is fitted in an opening formed in the wiper frame. The cylinder has a through hole through which a bolt is inserted. One flange is located between the wiper frame and a washer secured to the bolt. The other flange is located between the wiper frame and the body frame. Each flange has an arched axial cross-sectional shape. The flanges reliably absorb axial vibration of the wiper frame.

19 Claims, 8 Drawing Sheets

VIBRATION ABSORBER FOR VEHICLE WIPER DEVICES

BACKGROUND OF THE INVENTION

The present invention relates to vibration absorbers preferably used for vehicle wiper devices, and, more particularly, to vibration absorbers arranged between wiper frames and vehicle body frames.

Figure 5:
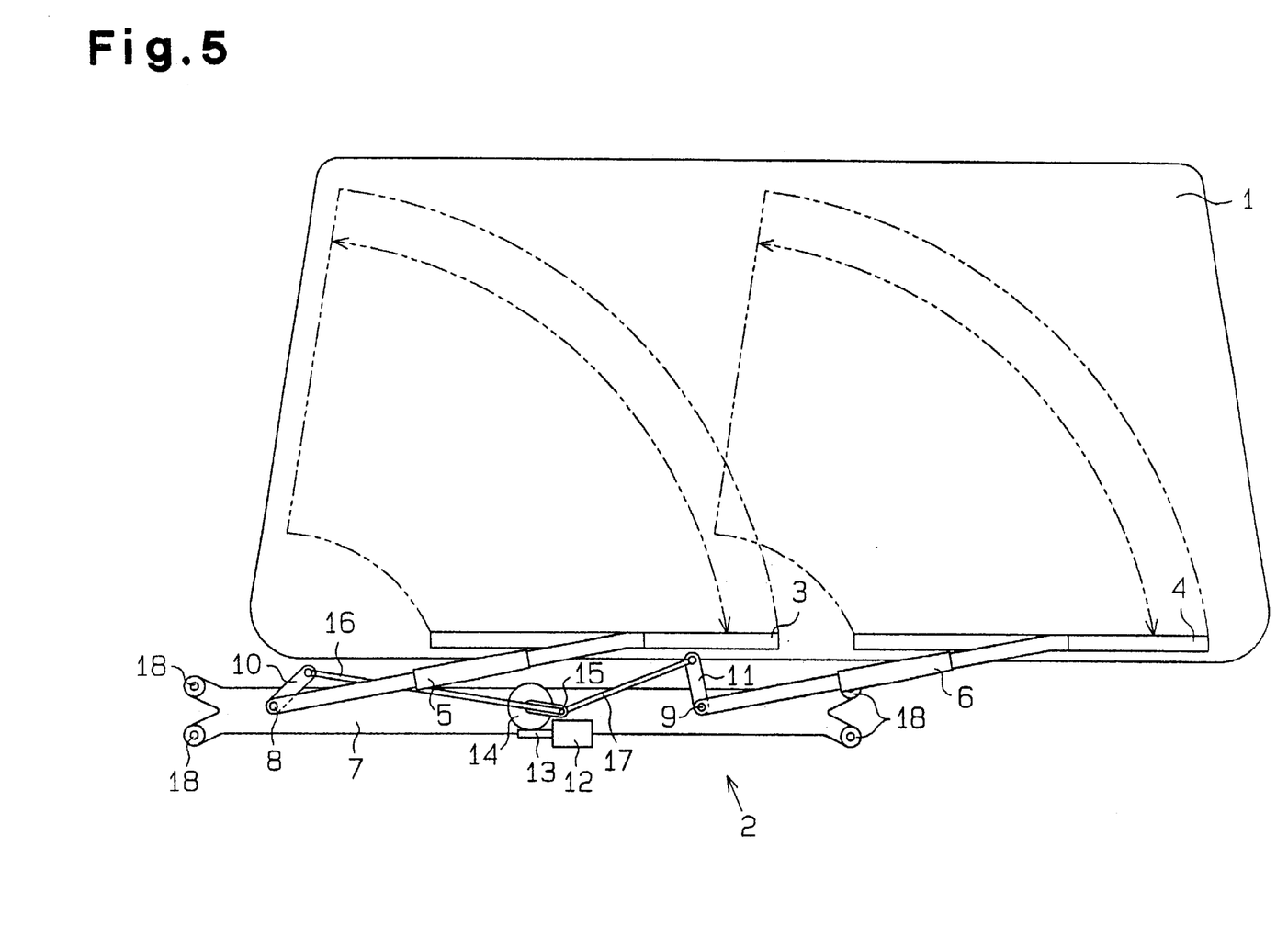
FIG. 5 is a front view showing a typical wiper device for vehicles.

As shown in FIG. 5, a wiper device 2 is typically provided along a lower side of a windshield 1 of a vehicle. The wiper device 2 has a pair of wiper arms 5, 6. A pair of wiper blades 3, 4 are secured to the distal ends, or ends spaced from a wiper frame 7, of the associated wiper arms 5, 6. Each wiper blade 3, 4 wipes a substantial area of an associated half of the windshield 1 with respect to the longitudinal middle of the windshield 1. The proximal ends, or bases, of the wiper arms 5, 6 are rotationally supported by associated shafts 8, 9. The shafts 8, 9 are secured to the wiper frame 7. A pair of movable levers 10, 11 are rotationally supported by the associated shafts 8, 9 at the bases, or proximal ends, of the levers 10, 11. In other words, the movable levers 10, 11 are connected to the associated wiper arms 5, 6 to rotate integrally with the wiper arms 5, 6 with respect to the associated shafts 8, 9.

A worm 13 is coupled with the output shaft of a motor 12 and meshes with a worm wheel 14. A base, or proximal end, of a drive lever 15 is secured to the center of the worm wheel 14. The distal end of the drive lever 15 is connected to the distal ends of the movable levers 10, 11 through associated link rods 16, 17.

When the motor 12 rotates the worm wheel 14 by means of the worm 13, the drive lever 15 is rotated to extend and retract the link rods 15, 16. Accordingly, the movable levers 10, 11 are rotated integrally with the associated wiper arms 5, 6 within a predetermined range around the associated shafts 8, 9. Every rotation cycle of the worm wheel 14 corresponds to one movement cycle of each wiper arm 5, 6. The movement cycle of the wiper arms 5, 6 is defined as proceeding from a lowermost position to an uppermost position and then returning to the lowermost position. While the wiper arms 5, 6 repeat their movement cycles, the wiper blades 3, 4 wipe corresponding portions of the windshield 1, as indicated by the double-dotted chain lines in FIG. 5.

When the link rods 16, 17 are extended and retracted, force acts on the wiper frame 7 through the shafts 8, 9 to vibrate the wiper frame 7. To counter this, a rubber vibration absorber 18 is deployed between the wiper frame 7 and the vehicle body frame when installing the wiper frame 7. The vibration absorber 18 prevents the vibration of the wiper frame 7 from being transmitted to the body frame. The vibration absorber 18 also absorbs vibration of the motor 12. In the wiper device 2 of FIG. 5, for example, four vibration absorbers 18 are provided at corresponding ends of the wiper frame 7.

Figure 6:
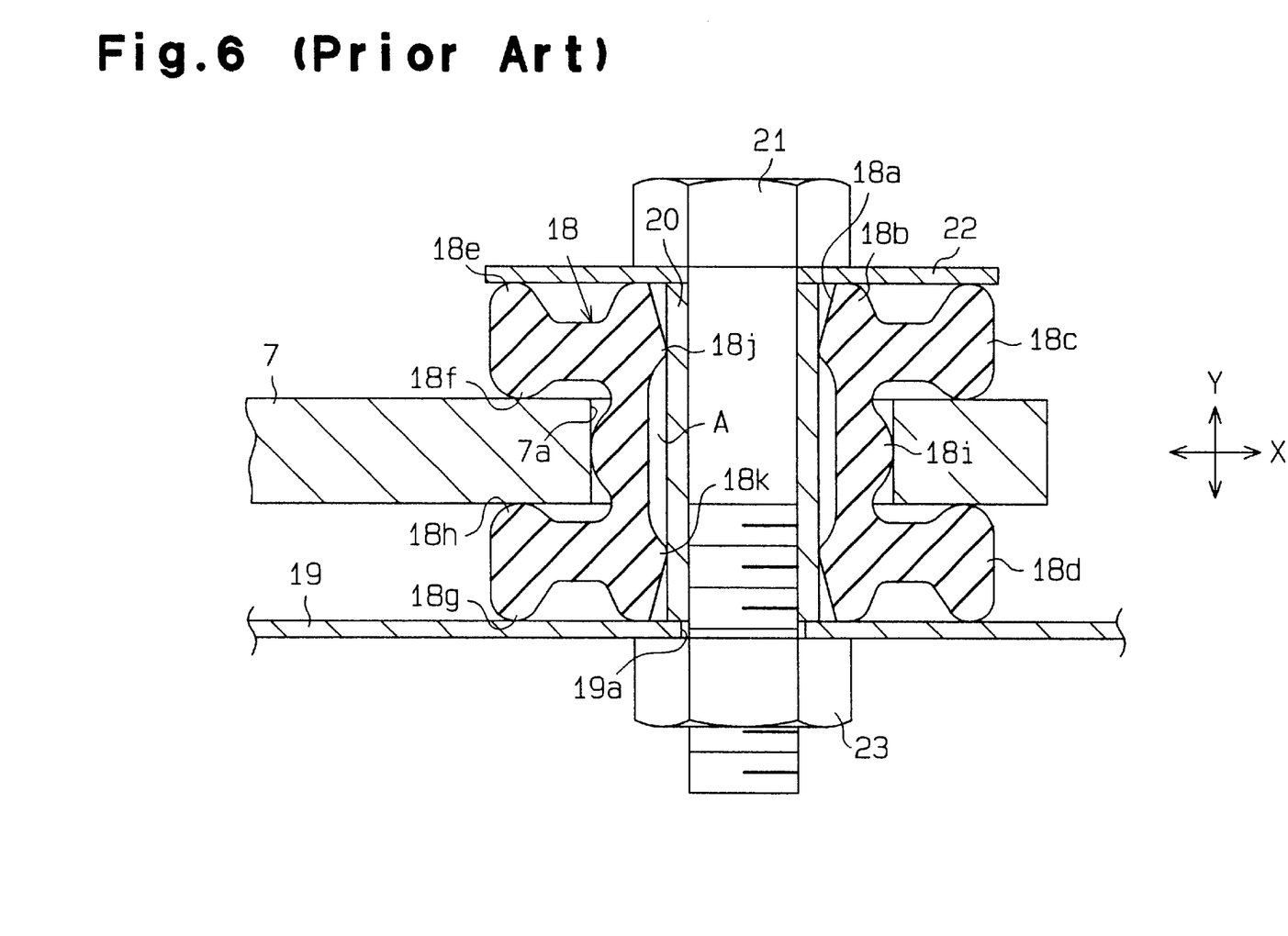
FIG. 6 is a cross-sectional view showing a prior art vibration absorber.

FIG. 6 shows the structure of the vibration absorber 18. Specifically, the vibration absorber 18 has a cylinder 18b and a pair of substantially annular flanges 18c, 18d. The flanges 18c, 18d extend from near opposite axial ends of the cylinder 18b. The recess of the cylinder 18b is defined as a through hole 18a in which a cylindrical collar 20 is fitted. A bolt 21 is inserted in the collar 20. A washer 22 is fitted around the bolt 21. One axial end of the collar 20 abuts the washer 22. The other axial end of the collar 20 abuts a body frame 19. The vibration absorber 18 is fitted in an opening 7a extending in the wiper frame 7. The distal end of the bolt 21 is inserted in a hole 19a extending in the body frame 19. A nut 23 is fastened to the distal end of the bolt 21 to fasten the wiper frame 7 to the body frame 19.

One flange 18c is located between the wiper frame 7 and the washer 22 and has a pair of annular projections 18e, 18f. The projections 18e, 18f are located at a radial outer section of the flange 18c and project in opposite directions along the axis of the vibration absorber 18. One projection 18e abuts against the washer 22, and the other projection 18f abuts against the wiper frame 7. The other flange 18d is located between the wiper frame 7 and the body frame 19. The flange 18d is shaped as a mirror image of the flange 18c and has a pair of projections 18h, 18g. One projection 18g abuts against the body frame 19, and the other projection 18h abuts against the wiper frame 7.

An annular projection 18i is projected from the axial middle of the cylinder 18b and abuts against the wall of the opening 7a of the wiper frame 7. The projection 18i has a substantially semi-circular cross-sectional shape. A pair of annular projections 18j, 18k project from the inner side of the cylinder 18b at positions substantially corresponding to the flanges 18c, 18d. The projections 18j, 18k have a substantially triangular cross-sectional shape. The projections 18j, 18k abut against the collar 20. The projections 18j, 18k form a clearance A between the inner side of the cylinder 18b and the collar 20. The clearance A enables a portion of the cylinder 18b corresponding to the annular projection 18i to elastically deform in a radially inward direction.

The vibration absorber 18 absorbs a vibration component acting along axis Y of the wiper frame 7, or along the axis of the vibration absorber 18, through elastic deformation of the projections 18e to 18h. The vibration absorber 18 also absorbs a vibration component acting along axis X of the wiper frame 7, or in a radial direction of the vibration absorber 18, through elastic deformation of the projections 18i to 18k and by means of the clearance A.

The annular projections 18e to 18h are located coaxially with one another and define a uniform diameter with respect to the axis of the vibration absorber 18. In other words, the projections 18e to 18h are located along a line parallel to the axis of the vibration absorber 18. In this state, the projections 18e to 18h abut against the washer 22, the wiper frame 7, or the body frame 19 at positions spaced radially from the axis of the vibration absorber 18 by a uniform distance. Accordingly, vibration of the wiper frame 7 along axis Y is readily transmitted to the body frame 19 through the projections 18e to 18h. As described above, the vibration absorber 18 absorbs the vibration of the wiper frame 7 along axis Y only through elastic deformation of the projections 18e to 18h. Accordingly, the vibration absorbing performance of the vibration absorber 18 depends greatly on the hardness of the rubber forming the vibration absorber 18. However, it is difficult to optimize the vibration absorbing performance only by adjusting the rubber hardness of the vibration absorber 18. Furthermore, if the rubber hardness is decreased to improve the vibration absorbing performance, the wiper frame 7 is not reliably secured to the body frame 19.

Figure 7A:
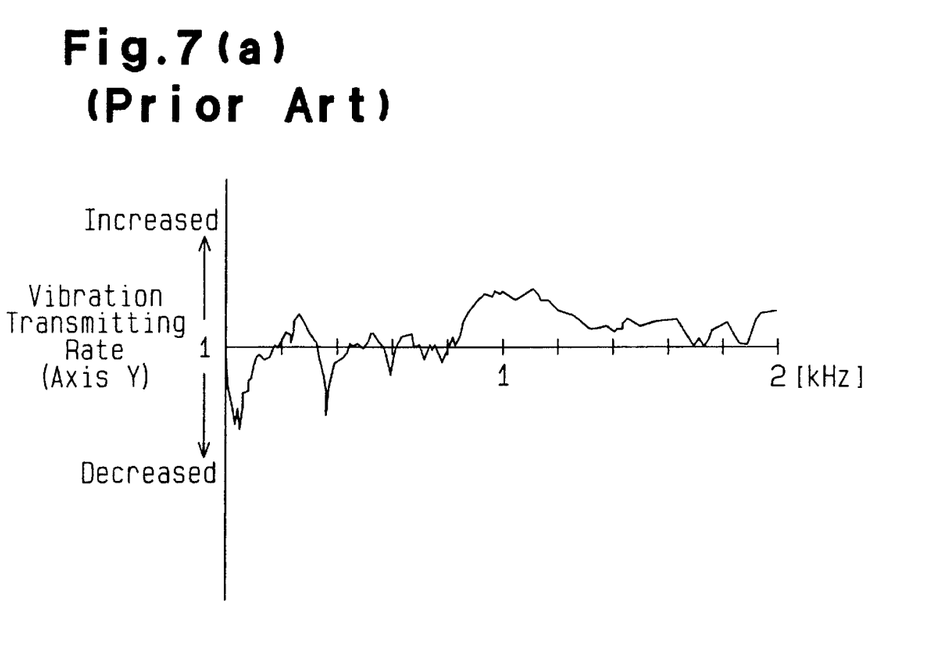
FIG. 7(a) is a graph showing a rate at which vibration is transmitted to the vehicle body frame along axis Y of the wiper frame through the vibration absorber of FIG. 6.
Figure 7B:
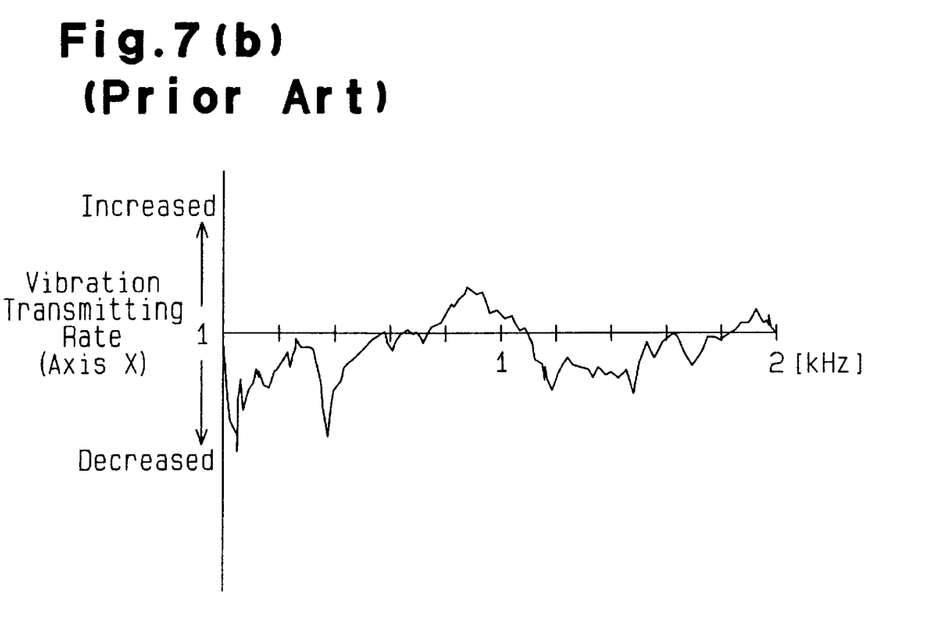
FIG. 7(b) is a graph showing a rate at which vibration is transmitted to the vehicle body frame along axis X of the wiper frame through the vibration absorber of FIG. 6.

The vibration absorbing performance of the vibration absorber 18 shown in FIG. 6 will hereafter be explained with reference to FIGS. 7(a) and 7(b). FIGS. 7(a) and 7(b) are graphs showing a rate at which the vibration of the wiper frame 7 is transmitted to the body frame 19 in the vicinity of the wiper frame 7. FIG. 7(a) shows the vibration transmission rate along axis Y of the wiper frame 7, and FIG. 7(b) shows the vibration transmission rate along axis X of the wiper frame 7. The natural frequency of the motor 12 shown in FIG. 5 is approximately 500 Hz, and its harmonic component is 1 kHz. As shown in FIG. 7(a), the vibration transmission rate is increased particularly for frequencies close to 1 kHz.

As shown in FIG. 7(b), the vibration transmission rate along axis X is decreased as compared to the vibration transmission rate along axis Y shown in FIG. 7(a). This is due to relatively small contact areas through which the projections 18i to 18k contact the wiper frame 7 or the collar 20. That is, elastic deformation of the projections 18i to 18k is relatively free.

However, when each wiper arm 5, 6 turns, or changes its moving directions at its uppermost position and its lowermost position, an increased force of inertia or reactive force acts on the wiper frame 7 along axis X. Since the projections 18i to 18k are relatively freely deformed as described, the projections 18i to 18k may be deformed excessively along axis X due to such force. This displaces the positions of the shafts 8, 9 secured to the wiper frame 7 with respect to the windshield 1. Accordingly, the portions of the windshield 1 wiped by the wiper blades 3, 4 are also displaced.

If the vibration absorber 18 is formed of relatively soft rubber, the vibration absorbing performance is improved. However, in this case, the vibration absorber 18 is further freely deformed along axis X due to the force of inertia or reactive force caused by the turning of the wiper arms 5, 6. Accordingly, the displaced amount of the positions of the shafts 8, 9 is further increased, so is the displaced amount of the portions of the windshield 1 wiped by the wiper blades 3, 4. In this case, the wiper blade 3, 4 may interfere with a pillar of the vehicle body frame when being moved by the associated wiper arms 5, 6.

To the contrary, if the vibration absorber 18 is formed of relatively hard rubber, the deformation of the vibration absorber 18 due to the force of inertia or reactive force caused by the turning of the wiper arms 5, 6 is suppressed. Thus, the vibration absorbing performance of the vibration absorber 18 is lowered.

As described, improving vibration absorbing performance and suppressing deformation of the vibration absorber 18 are not achieved at one time simply by adjusting the hardness of the vibration absorber 18.

Figure 8:
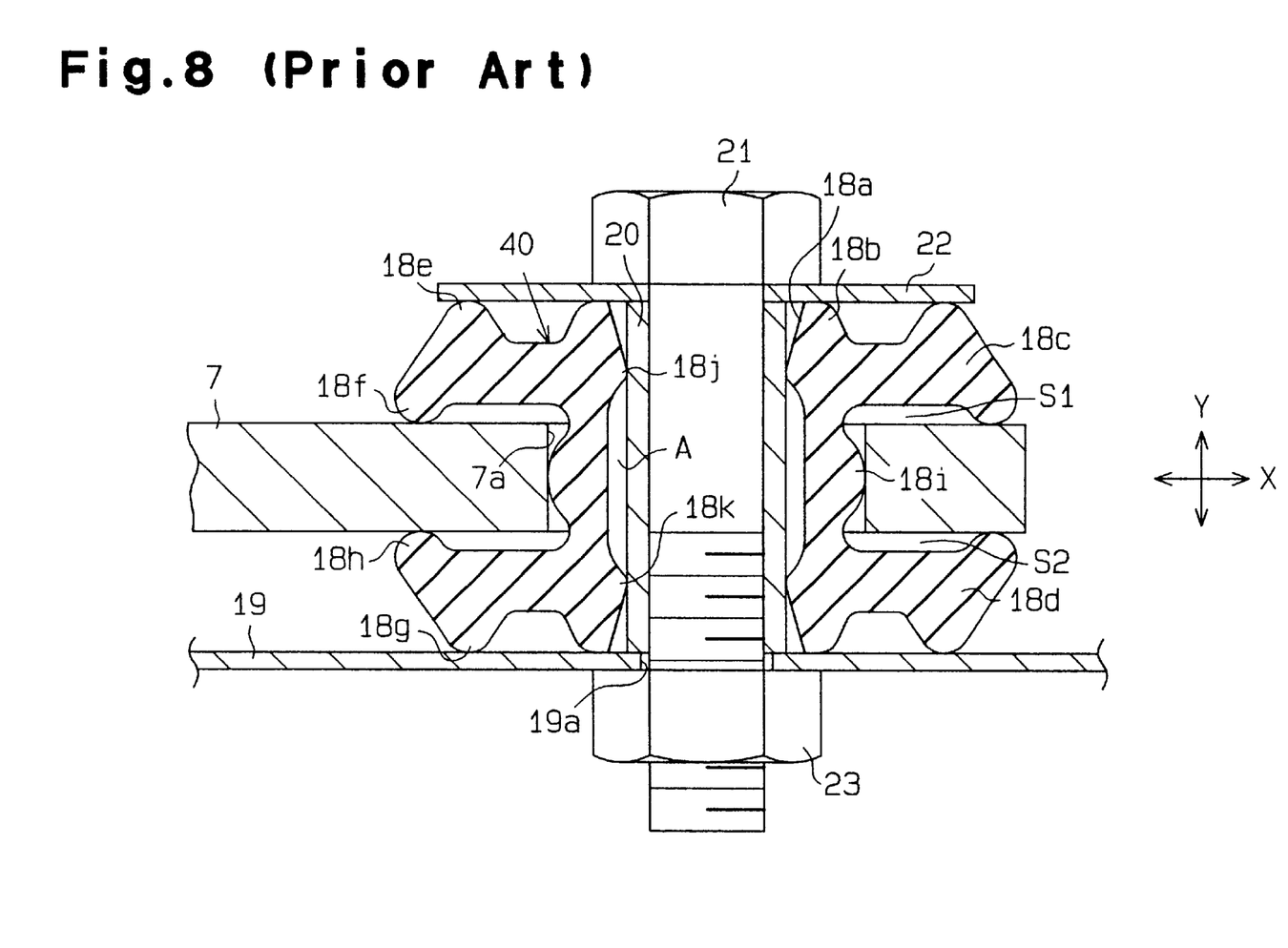
FIG. 8 is a cross-sectional view showing another prior art vibration absorber.

FIG. 8 is a cross-sectional view showing another prior art vibration absorber 40. The vibration absorber 40 has an improved vibration absorbing performance regarding axis Y of the wiper frame 7, as compared to the vibration absorber 18 of FIG. 6. Same or like reference numerals are given to parts in FIG. 8 that are the same as or like corresponding parts in FIG. 6. As shown in FIG. 8, the annular projections 18f, 18h of the vibration absorber 40 are located radially outward from the annular projections 18e, 18g. In other words, the radial positions of the projections 18f, 18h are different from those of the projections 18e, 18g. This suppresses transmission of vibration acting along axis Y of the wiper frame 7 to the body frame 19 through the projections 18e to 18h.

A clearance S1 between the flange 18c and the wiper frame 7 is located immediately below the projection 18e. Further, a clearance S2 between the flange 18d and the wiper frame 7 is located immediately above the projection 18g. Each clearance S1, S2 allows a portion of the associated flange 18c, 18d corresponding to the associated projection 18e, 18g to deform toward the wiper frame 7. This advantageously absorbs vibration of the wiper frame 7 along axis Y.

However, each flange 18c, 18d of the vibration absorber 40 defines a plane extending parallel to a plane perpendicular to the axis of the flange 18c, 18d. Thus, when the washer 22 or the body frame 19 applies force to the associated projection 18e, 18g along axis Y due to vibration of the wiper frame 7, the associated flange 18c, 18d deforms with respect to its radial inner section. Accordingly, most of the force applied to each projection 18e, 18g is received by the associated projection 18f, 18h, which is located at a radial outer section of the flange 18c, 18d. As a result, although improved as compared to the vibration absorber 18 of FIG. 6, vibration absorption along axis Y is still insufficient.

Furthermore, the portion of the vibration absorber 40 that absorbs vibration along axis X is configured exactly the same as that of the vibration absorber 18. Accordingly, regarding vibration along axis X, the vibration absorber 40 does not provide any improvement of both the vibration absorbing performance and suppressing of deformation of the vibration absorber 40.

SUMMARY OF THE INVENTION

Accordingly, it is an objective of the present invention to provide a vibration absorber preferably used for vehicle wiper devices and having improved vibration absorbing performance while suppressing unnecessary deformation of the vibration absorber.

To achieve the above objective, the present invention provides an elastic vibration absorber provided between a supported body and a support. The vibration absorber is fitted in an attachment opening formed in the supported body and is secured to the support with a securing member. The vibration absorber includes a cylinder and a pair of flanges. The cylinder is fitted in the attachment opening of the supported body and has a through hole through which the securing member is inserted. The flanges are provided near opposite axial ends of the cylinder to clamp the supported body. One flange is located between the supported body and a receiving surface provided for the securing member, the other flange is located between the supported body and the support. Each flange has an arched, axial cross-sectional shape.

The present invention also provides an elastic vibration absorber provided between a supported body and a support. The vibration absorber is fitted in an attachment opening formed in the supported body and is secured to the support with a securing member. The vibration absorber includes a cylinder having a through hole through which the securing member is inserted. An engaging portion is arranged around an axial middle portion of the cylinder and is fitted in the attachment opening. The engaging portion has an outer wall contacting a wall defining the attachment opening and an inner wall forming part of the through hole. A pair of contact surfaces are located at opposite axial ends of the cylinder. One contact surface contacts a receiving surface of the securing member and the other contacts the support. A pair of flanges are provided near the opposite axial ends of the cylinder to clamp the supported body. One flange is located between the supported body and the receiving surface of the securing member, and the other flange is located between the supported body and the support. A pair of thin portions are provided along the cylinder at positions corresponding to the opposite axial ends of the engaging portion for connecting the associated flanges to the engaging portion. A minimum radius defined by an outer periphery of each thin portion is smaller than a radius defined by a maximum outer diameter section of each contact surface.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described with reference to FIGS. 1 to 4. The structure of the wiper device shown in FIGS. 1 to 4 is identical to that of FIGS. 5 and 6 except for the vibration absorbers. Thus, same or like reference numerals are given to parts in FIGS. 1 to 4 that are the same as or like corresponding parts in FIGS. 5 and 6.

Figure 1:
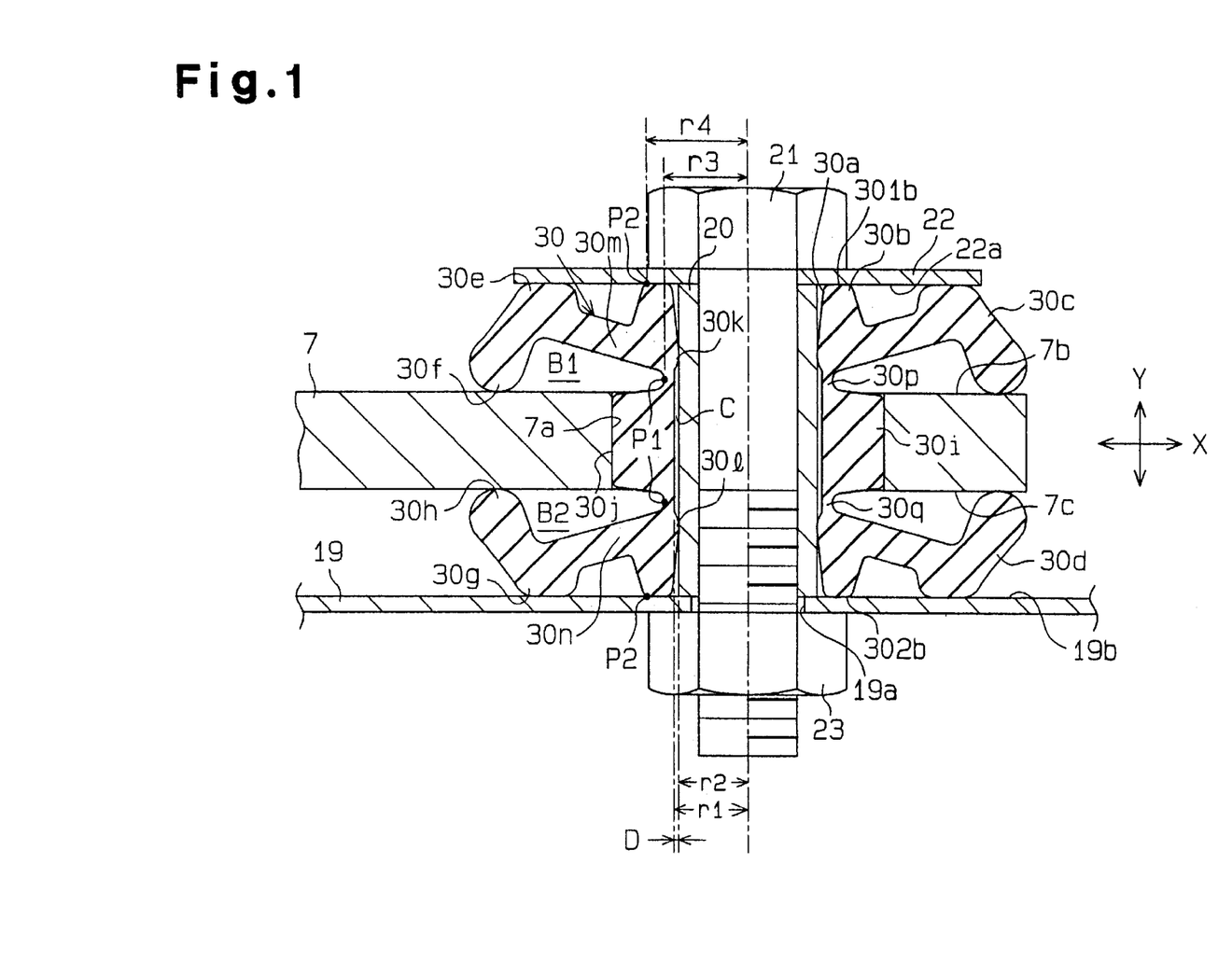
FIG. 1 is a cross-sectional view showing an embodiment of a vibration absorber according to the present invention mounted between a wiper frame and a vehicle body frame.
Figure 2:
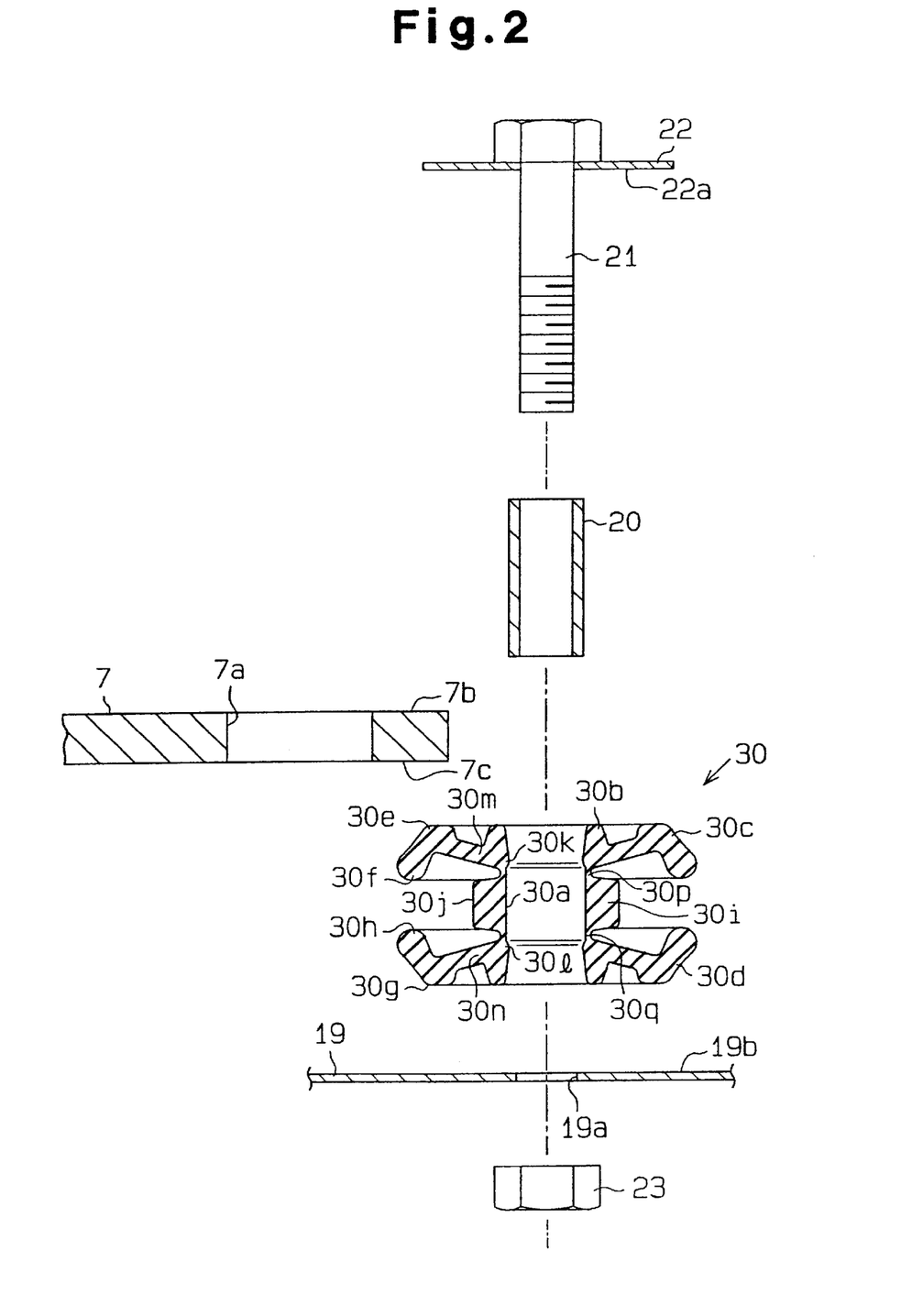
FIG. 2 is an exploded cross-sectional view showing the vibration absorber of FIG. 1 in a state separated from the wiper frame and the vehicle body frame.

FIGS. 1 and 2 show an embodiment of a vibration absorber 30 in accordance with the present invention. The vibration absorber 30 is formed of rubber having the same hardness as the prior art vibration absorber 18 of FIG. 6. The vibration absorber 30 has a cylinder 30b and a pair of annular flanges 30c, 30d. A recess of the cylinder 30b is defined as a through hole 30a in which a collar 20 is accommodated. The flanges 30c, 30d extend radially outward from the cylinder 30b and are located near opposite axial ends of the cylinder 30b. The flanges 30c, 30d are coupled to the cylinder 30b at radial inner sections 30m, 30n, respectively.

The vibration absorber 30 is inserted through an opening 7a formed in an end of a wiper frame 7. Specifically, this end of the wiper frame 7 has, although not illustrated, a cut-away section. This cut-away section opens a portion of the wall exposing the opening 7a to the exterior of the wiper frame 7. The portion of the cylinder 30b between the flanges 30c, 30d is guided to the opening 7a by the cut-away section of the wiper frame 7. When this portion of the cylinder 30b is fitted in the opening 7a, the flanges 30c, 30d clamp the wiper frame 7. In this state, the vibration absorber 30 is fastened to a vehicle body frame 19 with a bolt 21 and a nut 23.

The flange 30c, or upper flange, is located between the wiper frame 7 and the washer 22 and has a substantially arched cross-sectional shape. Specifically, a portion of the flange 30c extending radially outward from its radial inner section 30m to its radial intermediate section is slanted upward toward the washer 22. In contrast, a portion of the flange 30c extending radially outward from its radial intermediate section to its radial outermost section is slanted downward toward the wiper frame 7. In other words, a ridge is formed by the radial intermediate section of the flange 30c.

An annular, intermediate projection 30e is formed by the ridge of the flange 30c and projects upward along the axis of the vibration absorber 30 (toward the washer 22). The projection 30e has a substantially semicircular cross-sectional shape and abuts against a lower side 22a of the washer 22. An annular, outer projection 30f is formed by the radial outer section of the flange 30c and projects downward along the axis of the vibration absorber 30 (toward the wiper frame 7). The projection 30f has a substantially semicircular cross-sectional shape and abuts against an upper side 7b of the wiper frame 7.

As shown in FIG. 1, a clearance B1 is formed between the flange 30c and the wiper frame 7. The outer projection 30f is provided radially outward from the intermediate projection 30e such that the clearance B1 is defined immediately below the projection 30e. The clearance B1 thus allows a portion of the flange 30c corresponding to the projection 30e to deform toward the wiper frame 7. In other words, the clearance B1 receives the deformed portion of the flange 30c.

The flange 30d, or lower flange, is located between the wiper frame 7 and the vehicle body frame 19. The flange 30d is shaped as a mirror image of the flange 30c and also has a substantially arched cross-sectional shape. Specifically, a portion of the flange 30d extending radially outward from its radial inner section 30n to its radial intermediate section is slanted downward toward the body frame 19. In contrast, a portion of the flange 30d extending radially outward from its radial intermediate section to its radial outermost section is slanted upward toward the wiper frame 7. In other words, a ridge is formed by the radial intermediate section of the flange 30d.

An annular, intermediate projection 30g is formed by the ridge of the flange 30d and projects downward along the axis of the vibration absorber 30 toward the body frame 19. The projection 30g has a substantially semicircular cross-sectional shape and abuts against an upper side 19b of the body frame 19. An annular, outer projection 30h is formed by the radial outer section of the flange 30d and projects upward along the axis of the vibration absorber 30 toward the wiper frame 7. The projection 30h has a substantially semicircular cross-sectional shape and abuts against a lower side 7c of the wiper frame 7.

As shown in FIG. 1, a clearance B2 is formed between the flange 30d and the wiper frame 7. The outer projection 30h is provided radially outward from the intermediate projection 30g such that the clearance B2 is defined immediately above the projection 30g. The clearance B2 thus allows a portion of the flange 30d corresponding to the projection 30g to deform toward the wiper frame 7. In other words, the clearance B2 receives the deformed portion of the flange 30d.

An annular, middle projection 30*i* is projected radially outward from the axial middle of the cylinder 30*d*. The middle projection 30*i* has a substantially square cross-sectional shape and abuts against the wall of the opening 7*a* of the wiper frame 7. The projection 30*i* has a contact surface 30*j* that contacts the entire wall of the opening 7*a* in a planar contact manner. That is, the contact surface 30*j* is a cylindrical surface extending parallel to the axis of the vibration absorber 30. The axial dimension of the contact surface 30*j* is substantially equal to that of the wall of the opening 7*a*.

The cylinder 30*b* has a pair of annular, thin portions 30*p*, 30*q* located at positions corresponding to the opposite axial sides of the projection 30*i*. The thin portion 30*p* connects the projection 30*i* to the flange 30*c* at the radial inner section 30*m* of the flange 30*c*. The thin portion 30*q* connects the projection 30*i* to the flange 30*d* at the radial inner section 30*n* of the flange 30*d*. The cylinder 30*b* also has a pair of projections 30*k*, 30*l* projected radially inward from the inner side of the cylinder 30*b*. The projections 30*k*, 30*l* have a substantially triangular cross-sectional shape and abut against the collar 20. The projections 30*k*, 30*l* are located at positions that substantially correspond to the radial inner sections 30*m*, 30*n* of the associated flanges 30*c*, 30*d*. The projections 30*k*, 30*l* are spaced axially from the middle projection 30*i* by a uniform distance. Each projection 30*k*, 30*l* is located closer to the associated axial end of the cylinder 30*b* than the associated thin portion 30*p*, 30*q*.

As shown in FIG. 1, a clearance C is defined by the annular projections 30*k*, 30*l* between the inner side of the cylinder 30*b* and the collar 20. The clearance C allows a portion of the cylinder 30*b* corresponding to the projection 30*i* to deform radially inward. The inner radius r1 defined by the middle projection 30*i* with respect to the axis of the vibration absorber 30 is slightly larger than the outer radius r2 of the collar 20, as shown in FIG. 1. The clearance C has a radial dimension D, or a value obtained by the equation: r1–r2.

The cylinder 30*b* has a pair of annular contact surfaces 301*b*, 302*b* at its opposite axial ends. The contact surface 301*b* contacts the lower side 22*a* of the washer 22, and the contact surface 302*b* contacts the upper side 19*b* of the body frame 19. The contact surfaces 301*b*, 302*b* are located at positions corresponding to the radial inner sections 30*m*, 30*n* of the associated flanges 30*c*, 30*d*. That is, the contact surfaces 301*b*, 302*b* function as inner projections of the associated flanges 30*c*, 30*d*.

As shown in FIG. 1, each thin portion 30*p*, 30*q* has a section P1 located along the outer circumference of the thin portion 30*p*, 30*q*. The section P1 corresponds to a radial innermost portion of the outer circumference of the thin portion 30*p*, 30*q*. Furthermore, as shown in FIG. 1, each contact surface 301*b*, 302*b* of the cylinder 30*b* has a section P2. The section P2 corresponds to a radial outermost portion of the contact surface 301*b*, 302*b*. In this embodiment, the vibration absorber 30 is shaped such that the section P1 is located radially inward from the section P2. In other words, a radius r3 defined by the section P1 with respect to the axis of the vibration absorber 30 is smaller than a radius r4 defined by the section P2 with respect to the axis of the vibration absorber 30. Furthermore, in this embodiment, the section P1 is located radially inward from a radial intermediate portion of the associated contact surface 301*b*, 302*b*.

The thickness of the thin portions 30*p*, 30*q*, or, more specifically, the thickness of the thin portions 30*p*, 30*q* corresponding to the sections P1 as measured in the radial direction, is 20% or less than that of the middle projection 30*i*.

The operation of the vibration absorber 30 will now be described.

When the wiper frame 7 vibrates, some of a vibration component acting along axis Y of the wiper frame 7 (along the axis of the vibration absorber 30) is absorbed through elastic deformation of the projections 30*e* to 30*h*. Specifically, the clearances B1, B2 allow the portions of the associated flanges 30*c*, 30*d* corresponding to the associated intermediate projections 30*e*, 30*g* to readily deform toward the wiper frame 7. It is thus unnecessary to reduce the rubber hardness of the vibration absorber 30 to sufficiently absorb the vibration component acting along axis Y of the wiper frame 7. The vibration absorber 30 of this embodiment absorbs even slight vibration of the wiper frame 7 effectively. Furthermore, the intermediate projections 30*e*, 30*g* contact the washer 22 or the body frame 19 through a relatively small contact area. Thus, even when vibration along axis Y of the wiper frame 7 is transmitted to the vibration absorber 30 through the outer projections 30*f*, 30*h*, the vibration is not readily transmitted to the washer 22 or the body frame 19.

As described above, the flanges 30*c*, 30*d* have a substantially arched cross-sectional shape. That is, the portions of the flanges 30*c*, 30*d* extending radially outward from their radial inner sections 30*m*, 30*n* to their radial intermediate sections are slanted to separate from the wiper frame 7, with respect to a plane perpendicular to the axis of the vibration absorber 30. In contrast, the portions of the flanges 30*c*, 30*d* extending radially outward from their radial intermediate sections to their radial outer sections are slanted to approach the wiper frame 7, with respect to a plane perpendicular to the axis of the vibration absorber 30. Accordingly, when reactive force is applied to the intermediate projection 30*e*, 30*g* from the washer 22 or the body frame 19 along axis Y due to vibration of the wiper frame 7, the force acts in a direction toward the radial inner section 30*m*, 30*n* and a direction toward the radial outer section of the flange 30*c*, 30*d*. In other words, the flanges 30*c*, 30*d* absorb force produced by a vibration component along axis Y by dispersing the force in different directions. Accordingly, the vibration component acting along axis Y of the wiper frame 7 is absorbed reliably.

Further, the radius r3 defined by the section P1 of each thin portion 30*p*, 30*q* is smaller than the radius r4 defined by the section P2 of each contact surface 301*b*, 302*b*. Thus, when force is applied to each contact surface 301*b*, 302*b* by the washer 22 or the body frame 19 due to the vibration component along axis Y, the force's point of action on the contact surface 301*b*, 302*b* is located radially outward from the section P1. The flanges 30*c*, 30*d* thus deform toward the wiper frame 7 with respect to the section P1. This deformation consumes some of the force acting on the contact surfaces 301*b*, 302*b* along axis Y, thus absorbing the vibration component along axis Y. Particularly, in this embodiment, the section P1 of each thin portion 30*p*, 30*q* is located radially inward from the radial intermediate portion of the associated contact surface 301*b*, 302*b*. This further facilitates the deformation of each flange 30*c*, 30*d* with respect to the associated section P1, thus improving the vibration absorbing performance of the vibration absorber 30.

As described above, the radius r3 defined by the section P1 of each thin portion 30*p*, 30*q* is relatively small. The thin portions 30*p*, 30*q* are thus located radially inward sufficiently from the projection 30*i*. This maximizes the radial dimension of each flange 30*c*, 30*d*, without increasing the size of the flanges 30*c*, 30*d*. That is, while preventing the vibration absorber 30, the rigidity of the flanges 30c, 30d is reliably decreased. As a result, force produced by the vibration component along axis Y is further reliably dispersed. This further improves the vibration absorbing performance of the vibration absorber 30 regarding the vibration component along axis Y.

A vibration component acting along axis X of the wiper frame 7 (in a radial direction of the vibration absorber 30) is absorbed through elastic deformation of the projections 30k, 30l and by the thin portions 30p, 30q elastically deformed to radially move the middle projection 30i. Specifically, when the vibration component along axis X acts on the vibration absorber 30, the middle projection 30i radially moves within a relatively small range, or a range defined by the radial dimension D of the clearance C. This efficiently absorbs the vibration component along axis X, without deforming the middle projection 30i in a radial direction.

The thickness of the thin portions 30p, 30q as measured in the radial direction is 20% or less than that of the middle projection 30i. That is, the thin portions 30p, 30q are located radially inward sufficiently from the middle projection 30i. This facilitates the movement of the middle projection 30i in accordance with vibration along axis X. Accordingly, the vibration absorber 30 reliably absorbs even a relatively small vibration component along axis X.

Each projection 30k, 30l contacts the collar 20 through a relatively small contact area. Thus, even if the vibration component along axis X is transmitted to the vibration absorber 30 through the middle projection 30i, the vibration is not readily transmitted to the collar 20.

Figure 4:
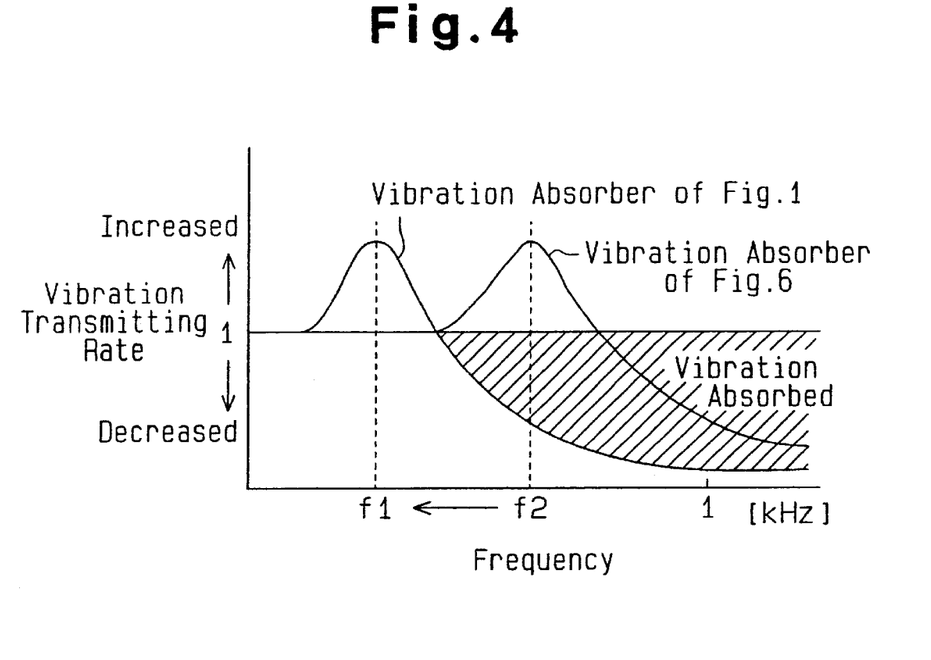
FIG. 4 is a graph comparing the vibration transmitting characteristics of the vibration absorber of FIG. 1 with those of a prior art vibration absorber shown in FIG. 6.

FIG. 4 is a graph comparing the vibration transmitting characteristics of the vibration absorber 30 of FIG. 1 with those of the vibration absorber 18 of FIG. 6. As shown in FIG. 4, the natural frequency f1 of the vibration absorber 30 shown in FIG. 1 is smaller than the natural frequency f2 of the prior art vibration absorber 18 shown in FIG. 6. Accordingly, the vibration absorber 30 of this embodiment absorbs vibration having frequency close to 1 kHz more effectively than the prior art vibration absorber 18.

Figure 3A:
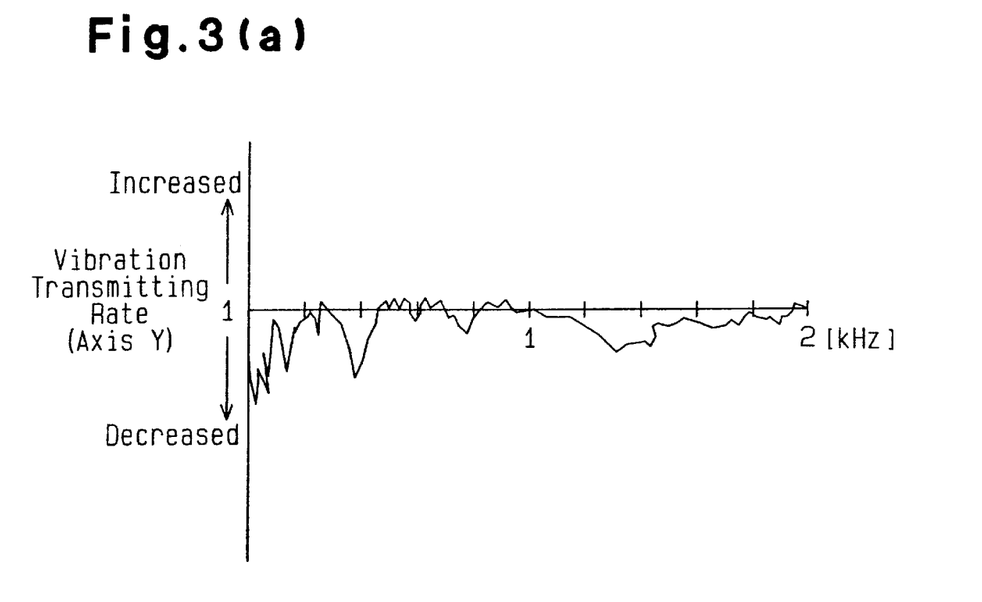
FIG. 3(a) is a graph showing a rate at which vibration is transmitted to the vehicle body frame along axis Y of the wiper frame through the vibration absorber of FIG. 1.
Figure 3B:
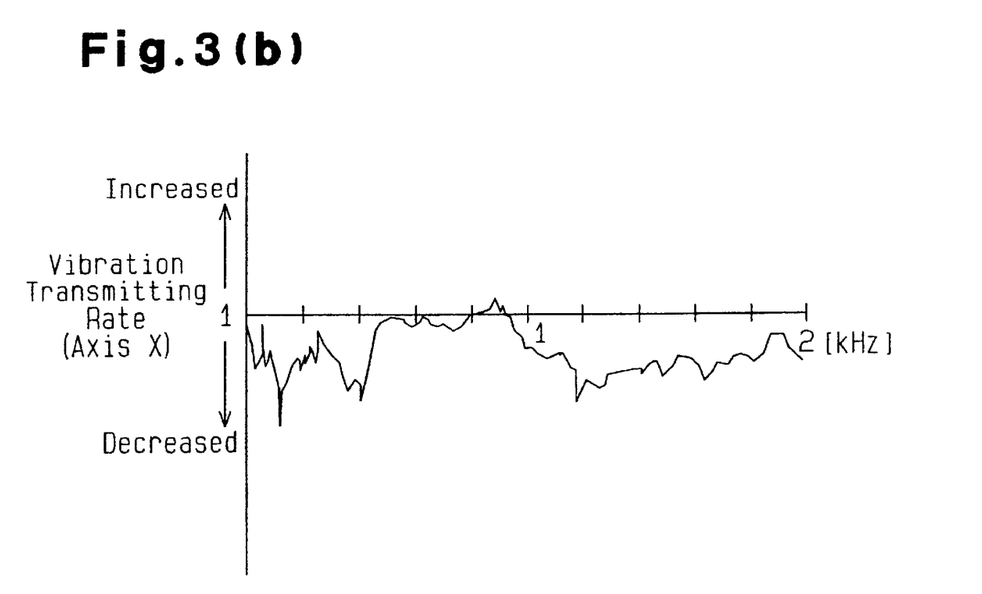
FIG. 3(b) is a graph showing a rate at which vibration is transmitted to the vehicle body frame along axis X of the wiper frame through the vibration absorber of FIG. 1.

FIGS. 3(a) and 3(b) are the graphs showing the vibration absorbing performance of the vibration absorber 30 of this embodiment. Each graph indicates a rate at which vibration is transmitted from the wiper frame 7 to the vehicle body frame 19 in the vicinity of the wiper frame 7. The graphs of FIGS. 3(a) and 3(b) show the results obtained under the same test conditions as those shown in the graphs of FIGS. 7(a) and 7(b).

As is clear from comparison between FIG. 3(a) and FIG. 7(a), the vibration absorber 30 has a reduced vibration transmission rate along axis Y over the substantially entire frequency range, as compared to the prior art vibration absorber 18. Particularly, the vibration absorber 30 significantly reduces the vibration transmission rate regarding vibration having a frequency close to 1 kHz. Furthermore, as is clear from comparison between FIG. 3(b) and FIG. 7(b), the vibration absorber 30 has a reduced vibration transmission rate along axis X over substantially the entire frequency range, as compared to the prior art vibration absorber 18.

The contact surface 30j of the middle projection 30i is a cylindrical surface entirely contacting the wall of the opening 7a in the wiper frame 7. Thus, as described above, even a relatively small vibration component along axis X is absorbed through elastic deformation of the projections 30k, 30l and radial movement of the middle projection 30i, without causing radial deformation of the projection 30i.

When each wiper arm 5, 6 turns, or changes its moving directions, an increased force of inertia or reactive force acts on the wiper frame 7 along axis X. Such force acting along axis X deforms the projections 30k, 30l contacting the collar 20 to cause the inner circumference of the middle projection 30i to abut against the collar 20. In this state, the inner circumference of the projection 30i contacts the collar 20 through a relatively large contact area extending along the axis of the collar 20. Accordingly, when the projection 30i abuts against the collar 20, or when the projection 30i is moved radially inward by the radial dimension D of the clearance C, the force acting along axis X does not cause the projection 30i to deform excessively. If force acting along axis X is further applied to the projection 30i that abuts against the collar 20, the projection 30i absorbs this force through its elastic deformation (compressive deformation) to prevent the wiper frame 7 from moving along axis X. Since the deformed amount of the projection 30i is relatively small, displacement of the shafts 8, 9 (see FIG. 5), which are secured to the wiper frame 7, is limited with respect to the windshield 1. This suppresses displacing the portions of the windshield 1 wiped by the wiper blades 3, 4 (e.g.; interfering of the wiper blades 3, 4 with a pillar of the vehicle).

The vibration absorber 30 shows different types of spring characteristics regarding vibration along its radial direction (axis X), or for a decreased radial force acting to move the projection 30i within the dimension D and an increased radial force acting to move the projection 30i beyond the dimension D. That is, one type is advantageous in absorbing relatively small vibration along axis X, and the other type is advantageous in receiving a relatively large force acting along axis X. In other words, the vibration absorber 30 has non-linear spring characteristics. This improves the vibration absorbing performance of the vibration absorber 30 while suppressing displacement of the wiper frame 7 due to deformation of the vibration absorber 30.

Further, the outer circumference of each thin portion 30p, 30q is located radially inward sufficiently from the projection 30i. In other words, the radial thickness of the thin portion 30p, 30q decreases with respect to the radial thickness of the projection 30i. This improves the responsiveness of the projection 30i for moving radially in accordance with a relatively small vibration. Accordingly, improving of the vibration absorbing performance of the vibration absorber 30 and suppressing of displacement of the wiper frame 7 is further reliably accomplished.

The above embodiment has the following advantages.

Since each flange 30c, 30d has a substantially arched cross-sectional shape, force caused by a vibration component acting along axis Y of the wiper frame 7 is dispersed in a plurality of directions. This reduces force received by each outer projection 30f, 30h. Further, some of the force acting along axis Y is absorbed by the intermediate projections 30e, 30g that is elastically deformed in the associated clearances B1, B2. This enhances the vibration absorbing performance of the vibration absorber 30 regarding a vibration component along axis Y. Accordingly, vibration is not readily transmitted from the wiper frame 7 to the body frame 19 or the washer 22.

The clearances B1, B2 are formed between the associated flanges 30c, 30d and the wiper frame 7. The clearances B1, B2 allow the portions of the flanges 30c, 30d corresponding to the intermediate projections 30e, 30 to readily deform toward the wiper frame 7.

The portion of each flange 30c, 30d extending radially outward from its radial inner section 30m, 30n to its radial intermediate section is slanted to separate from the wiper frame 7. Accordingly, for example, as compared to a case in which the same portion of each flange 30c, 30d extends parallel to a plane perpendicular to the axis of the flange 30c, 30d, the vibration component along axis Y is efficiently dispersed. This further improves the vibration absorbing performance of the vibration absorber 30.

Furthermore, the radius r3 defined by the section P1 of each thin portion 30p, 30q is smaller than the radius r4 defined by the section P2 of each contact surface 301b, 302b of the cylinder 30b. This further improves the vibration absorbing performance of the vibration absorber 30 regarding the vibration component along axis Y.

Since the flanges 30c, 30d are shaped like a ring, the flanges 30c, 30d efficiently absorb vibration of the wiper frame 7. Furthermore, the vibration absorbing characteristics of each flange 30c, 30d are uniform along its entire circumference. Thus, the vibration absorber 30 may be installed, regardless of orientation of the flanges 30c, 30d.

The projections 30e to 30h are elastically deformed to absorb vibration effectively. Furthermore, since each projection 30e, 30g contacts the washer 22 or the body frame 19 through a relatively small contact area, vibration is not readily transmitted to the washer 22 or the body frame 19. Accordingly, transmitting of vibration from the wiper frame 7 to the washer 22 or the body frame 19 is further reliably suppressed.

The vibration component acting along axis X of the wiper frame 7 is reliably absorbed through elastic deformation of the projections 30k, 30l and by the thin portions 30p, 30q deformed to radially move the projection 30i. Further, the contact area between each projection 30k, 30l and the collar 20 is relatively small. Accordingly, vibration is not readily transmitted from the middle projection 30i to the collar 20.

Since the vibration absorber 30 has non-linear spring characteristics regarding vibration along axis X, the vibration absorbing performance of the vibration absorber 30 is improved regarding vibration along axis X. Furthermore, displacement of the wiper frame 7 caused by deformation of the vibration absorber 30 is also suppressed.

The present invention may be embodied in the following modified forms.

The outline of each flange 30c, 30d need not be circular but may be other shapes, as viewed from its top or bottom. Furthermore, as long as the flanges 30c, 30d have a substantially arched cross-sectional shape, the flanges 30c, 30d do not necessarily have to be formed continuous in a circumferential direction.

Unlike FIG. 1, the flanges 30c, 30d may be shaped such that the intermediate projections 30e, 30g contact the wiper frame 7 and the outer projections 30f, 30h contact the washer 22 or the body frame 19.

The washer 22 may be formed integrally with the bolt 21.

The cross-sectional shape of the projections 30e to 30h is not restricted to being substantially semicircular but may be other shapes. Furthermore, the projections 30e to 30h may be omitted.

The cross-sectional shape of the projections 30k, 30l is not restricted to being substantially triangular but may be other shapes. Furthermore, the projections 30k, 30l may be omitted.

The cross-sectional shape of the middle projection 30i is not restricted to being substantially square but may be other shapes. However, it is preferred that the projection 30i contact the entire wall of the opening 7a formed in the wiper frame 7.

The axial dimension of the projection 30i may be larger than that of the opening 7a.

The vibration absorber 30 may be formed of resin, instead of rubber.

The wiper frame 7 may be secured to the body frame 19 by means of connecting members other than the bolt 21.

The vibration absorber 30 of FIG. 1 is used for suppressing vibration transmitting from the wiper device 2 to the body frame 19 of a vehicle. However, the vibration absorber 30 may be used for any device as long as the vibration absorber 30 is located between a vibrating portion and a portion connected to the vibrating portion.

Therefore, the present examples and embodiments are to be considered as illustrative and not restrictive and the invention is not to be limited to the details given herein, but may be modified within the scope and equivalence of the appended claims.

What is claimed is:

1. An elastic vibration absorber provided between a bracket supporting a wiper device and a vehicle body frame, wherein the vibration absorber is fitted in an attachment opening in the bracket and is secured to the body frame with a securing member, the vibration absorber comprising:

a cylinder fitted in the attachment opening and having a through hole through which the securing member is inserted, wherein the cylinder has a pair of contact surfaces at opposite axial ends and a pair of thin portions therebetween with one contact surface contacting the receiving surface of the securing member and the other contact surface contacting the body frame with a minimum radius defined by an outer periphery of each thin portion smaller than a radius defined by a maximum outer diameter section of each contact surface;

a pair of flanges provided near the opposite axial ends of the cylinder to clamp the bracket, wherein one flange is located between the bracket and a receiving surface provided for the securing member, the other flange is located between the bracket and the body frame, and each flange has an arched, axial cross-sectional shape, wherein a portion of each flange located between the cylinder and a radial intermediate location is inclined to extend away from the bracket in the radially outward direction, and a portion of each flange located between the radial intermediate location and the periphery of the flange is inclined to extend toward the bracket in the radially outward direction, and a ridge is formed at the radial intermediate location of each flange;

an outer abutting portion provided along the periphery of each flange for abutting against the bracket around the attachment opening; and an intermediate abutting portion formed at the ridge of each flange, wherein each intermediate abutting portion projects in a direction opposite to a direction in which the associated outer abutting portion projects, wherein one intermediate abutting portion abuts against the receiving surface of the securing member and the other abuts against the vehicle body frame.

2. The vibration absorber as set forth in claim 1, wherein the cylinder includes:

an engaging portion arranged between the flanges and fitted in the attachment opening, wherein the engaging portion has an outer wall contacting a wall defining the attachment opening in a planar contact manner and an inner wall forming part of the through hole with the pair of thin portions connecting the flanges to the engaging portion; and a pair of projections each located closer to the opposite axial ends of the cylinder than the associated thin portions and projecting radially from a wall defining the through hole toward the securing member, wherein the projections abut against the securing member to form a clearance between the inner wall of the engaging portion and the securing member, and the clearance allows the engaging portion to move radially.

3. The vibration absorber as set forth in claim 2, wherein substantially the entire wall defining the attachment opening contacts the outer wall of the engaging portion.

4. The vibration absorber as set forth in claim 2, wherein a thickness of each thin portion as measured in the radial direction is twenty percent or less than that of the engaging portion.

5. The vibration absorber as set forth in claim 1, wherein each flange radially extends from a portion of the cylinder that is spaced from the associated axial end of the cylinder by a predetermined distance.

6. An elastic vibration absorber provided between a supported body and a support, wherein the vibration absorber is fitted in an attachment opening formed in the supported body and is secured to the support with a securing member, the vibration absorber comprising:
 a cylinder having a through hole through which the securing member is inserted;
 an engaging portion arranged around an axial middle portion of the cylinder and fitted in the attachment opening, wherein the engaging portion has an outer wall contacting substantially an entire wall defining the attachment opening and an inner wall forming part of the through hole;
 a pair of contact surfaces each located at opposite axial ends of the cylinder with one contact surface contacting a receiving surface of the securing member and the other contacting the support;
 a pair of flanges provided near the opposite axial ends of the cylinder to clamp the supported body, wherein one flange is located between the supported body and the receiving surface of the securing member, and the other flange is located between the supported body and the support;
 a pair of thin portions provided along the cylinder at positions corresponding to the opposite axial ends of the engaging portion for connecting the associated flanges to the engaging portion, wherein a minimum radius defined by an outer periphery of each thin portion is smaller than a radius defined by a maximum outer diameter section of each contact surface; and
 a pair of projections, which project radially from a wall defining the through hole toward the securing member at positions closer to the opposite axial ends of the cylinder than the associated thin portions, wherein the projections abut against the securing member to form a clearance between the inner wall of the engaging portion and the securing member, and wherein the clearance allows the engaging portion to move radially.

7. The vibration absorber as set forth in claim 6, wherein:
 each flange has an outer abutting portion provided along its radial outer section for abutting against the supported body around the attachment opening;
 each flange also has an intermediate abutting portion provided between its radial outer section and its radial inner section and located radially inward from the associated outer abutting portion;
 each intermediate abutting portion projects in a direction opposed to a direction in which the associated outer abutting portion projects; and
 the intermediate abutting portion of one flange abuts against the receiving surface of the securing member and the intermediate abutting portion of the other flange abuts against the support.

8. The vibration absorber as set forth in claim 7, wherein:
 each flange has an arched, axial cross-sectional shape to form a ridge at its radial intermediate section; and
 each intermediate abutting portion is formed at the ridge of the associated flange.

9. The vibration absorber as set forth in claim 6, wherein a thickness of each thin portion as measured in the radial direction is twenty percent or less than that of the engaging portion.

10. The vibration absorber as set forth in claim 6, wherein the cylinder has an annular cross-sectional shape.

11. The vibration absorber as set forth in claim 6, wherein each flange radially extends from a portion of the cylinder that is spaced from the associated axial end of the cylinder by a predetermined distance.

12. An elastic vibration absorber provided between a supported body and a support, wherein the vibration absorber is fitted in an attachment opening formed in the supported body and is secured to the support with a securing member, the vibration absorber comprising:
 a cylinder fitted in the attachment opening of the supported body and having a through hole through which the securing member is inserted, wherein the cylinder has a pair of contact surfaces at opposite axial ends and a pair of thin portions therebetween with one contact surface contacting the receiving surface of the securing member and the other contact surface contacting the body frame with a minimum radius defined by an outer periphery of each thin portion smaller than a radius defined by a maximum outer diameter section of each contact surface;
 a pair of flanges provided near the opposite axial ends of the cylinder to clamp the supposed body, wherein one flange is located between the supported body and a receiving surface provided for the securing member, the other flange is located between the supported body and the support, and each flange has an arched, axial cross-sectional shape, wherein a portion of each flange located between the cylinder and a radial intermediate location is inclined to extend away from the supported body in the radially outward direction, and a portion of each flange located between the radial intermediate location and the periphery of the flange is inclined to extend toward the supported body in the radially outward direction, and a ridge is formed at the radial intermediate location of each flange;
 an outer abutting portion provided along the periphery of each flange, wherein the outer abutting portion abuts against the supported body around the attachment opening; and
 an intermediate abutting portion formed at the ridge of each flange, wherein each intermediate abutting portion projects in a direction opposite to a direction in which the associated outer abutting portion projects, and wherein one intermediate abutting portion abuts against the receiving surface of the securing member and the other abuts against the support.

13. The vibration absorber as set forth in claim 12, wherein the outer abutting portion and the intermediate abutting portion of each flange are annular projections extending coaxially around the axis of the cylinder.

14. The vibration absorber as set forth in claim 12, wherein the cylinder includes:

an engaging portion arranged between the flanges and fitted in the attachment opening, where the engaging portion has an outer wall contacting a wall defining the attachment opening in a planar contact manner and an inner wall forming part of the through hole with the pair of thin portions connecting the flanges to the engaging portion; and a pair of projections each located closer to the opposite axial ends of the cylinder than the associated thin portions and projecting radially from a wall defining the through hole toward the securing member, wherein the projections abut against the securing member to form a clearance between the inner wall of the engaging portion and the securing member, and the clearance allows the engaging portion to move radially.

15. The vibration absorber as set forth in claim 14, wherein substantially the entire wall defining the attachment opening contacts the outer wall of the engaging portion.

16. The vibration absorber as set forth in claim 14, wherein a thickness of each thin portion as measured in the radial direction is twenty percent or less than that of the engaging portion.

17. The vibration absorber as set forth in claim 12, wherein the cylinder has an annular cross-sectional shape.

18. The vibration absorber as set forth in claim 12, wherein the vibration absorber has non-linear spring characteristics regarding its radial direction.

19. The vibration absorber as set forth in claim 12, wherein each flange radially extends from a portion of the cylinder that is spaced from the associated axial end of the cylinder by a predetermined distance.

* * * * *